(12) United States Patent
Mitrakas et al.

(10) Patent No.: US 9,011,694 B2
(45) Date of Patent: Apr. 21, 2015

(54) METHOD FOR THE SYNTHESIS OF TETRAVALENT MANGANESE FEROXYHITE FOR ARSENIC REMOVAL FROM WATER

(75) Inventors: Manassis Mitrakas, Thessaloniki (GR); Konstantinos Symeonidis, Thessaloniki (GR); Sofia Tresintsi, Edessa (GR)

(73) Assignee: Loufakis Chemicals S.A., Sindos (GR)

( * ) Notice: Subject to any disclaimer, the term of this patent is extended or adjusted under 35 U.S.C. 154(b) by 90 days.

(21) Appl. No.: 13/876,484

(22) PCT Filed: Sep. 26, 2011

(86) PCT No.: PCT/GR2011/000042
§ 371 (c)(1),
(2), (4) Date: Mar. 28, 2013

(87) PCT Pub. No.: WO2012/042282
PCT Pub. Date: Apr. 5, 2012

(65) Prior Publication Data
US 2013/0180925 A1    Jul. 18, 2013

(30) Foreign Application Priority Data
Sep. 28, 2010 (GR) .............................. 20100100541

(51) Int. Cl.
*C02F 1/42* (2006.01)
*B01J 20/02* (2006.01)
(Continued)

(52) U.S. Cl.
CPC . *C02F 1/62* (2013.01); *B01J 20/06* (2013.01); *B01J 20/28004* (2013.01); *B01J 20/28019* (2013.01); *B01J 20/28021* (2013.01); *B01J 20/28061* (2013.01); *C01G 45/006* (2013.01);
(Continued)

(58) Field of Classification Search
USPC .......................................... 210/688; 502/406
See application file for complete search history.

(56) References Cited

U.S. PATENT DOCUMENTS

| 2003/0183579 A1 | 10/2003 | Bandyopadhya et al. |
| 2007/0080115 A1* | 4/2007 | Sylvester ...................... 210/688 |
| 2010/0051555 A1 | 3/2010 | Craft |

FOREIGN PATENT DOCUMENTS

| CN | 101024160 A | 8/2007 |
| WO | WO 2007/047624 A1 | 4/2007 |

OTHER PUBLICATIONS

International Search Report, Nov. 16, 2011, from International Phase of the instant application.
(Continued)

*Primary Examiner* — Chester Barry
(74) *Attorney, Agent, or Firm* — Jackson Patent Law Office

(57) ABSTRACT

The present invention refers to a method for the synthesis of an adsorbing material consisting of a single-phase tetravalent manganese feroxyhite ($\bar{o}$-Fe$_{(1-x)}$Mn$_x$OOH), in which a percentage of 0.05 to 25% of iron atoms has been isomorphically substituted by Mn(IV) atoms. Its production takes place in a continuous two-stage flow reactor at weakly acidic conditions (pH 4-7) and high redox (300-800 mV). The material can be used for the removal of both pentavalent and trivalent arsenic as well as other heavy metals form water. More specifically, its adsorption capacity and selectivity depending on the trivalent and pentavalent arsenic water content, are determined by the manganese percentage and the compact or hollow morphology of its structural unit which can be both controlled by the parameters of the synthesis procedure.

5 Claims, 4 Drawing Sheets

(51) Int. Cl.
*C02F 1/62* (2006.01)
*B01J 20/06* (2006.01)
*B01J 20/28* (2006.01)
*C01G 45/00* (2006.01)
*C02F 1/28* (2006.01)
*C02F 101/10* (2006.01)
*C02F 101/20* (2006.01)
*C02F 1/72* (2006.01)

(52) U.S. Cl.
CPC ......... *C01P 2002/50* (2013.01); *C01P 2002/72* (2013.01); *C02F 1/281* (2013.01); *C02F 2101/103* (2013.01); *C02F 2101/20* (2013.01); *C02F 1/72* (2013.01); *B01J 20/0222* (2013.01); *B01J 20/0229* (2013.01)

(56) References Cited

OTHER PUBLICATIONS

Kazunori Sato et al:"Preferential adsorption of lead ions on mn-substituted goethite particles in aqueous solutions of copper, lead and zinc", ite letters on batteries, New Technologies & Medicine, ITE-IBA Office, Brunswick, OH, US, vol. 5, No. 3, Jan. 1, 2004.

* cited by examiner

METHOD FOR THE SYNTHESIS OF TETRAVALENT MANGANESE FEROXYHITE FOR ARSENIC REMOVAL FROM WATER

The invention belongs to the field of chemical engineering and specifically in the water treatment technology by solid adsorbents. In the current state of the art, the solid adsorbents are used as filling media in a column bed for the removal by adsorption of heavy metals and especially arsenic from potable water and wastes.

Arsenic (As) presence in potable water is one of the most important and most widespread pollution problems of water. Long-range consumption of water with increased arsenic concentrations is proved to be related to the risk of cardiovascular diseases, diabetes, as well as skin, lung, bladder cancer and as a consequence to the increase of mortality. The limit for total arsenic concentration in potable water was set to 10 μg/L since 2001 in the U.S.A. and 1998 in the European Union. Arsenic appearance is mainly a problem occurring in underground water originating by natural sources (alluvial sediments and minerals washing) or anthropogenic activity. It is usually met in the form of pentavalent As(V) oxy-anions [$H_2AsO_4^-$/$HAsO_4^{2-}$] or uncharged form $H_3AsO_3$ of trivalent As(III), in a ratio determined by the redox of the environment and the acidity (pH). Specifically, in oxidizing conditions the presence of negative oxyanions of As(V) is favored, while under reducing environment the uncharged form of As(III) dominates. The oxidation state of arsenic is directly related to its toxicity since As(III) is 60 times more toxic than As(V).

Arsenic removal processes are categorized in the relatively selective and the non-selective. Non-selective (nanofiltration, reverse osmosis) are not preferable due to their high cost and the alteration of water composition. Between the relatively selective methods of arsenic removal the co-precipitation with trivalent iron and the adsorption are the dominant ones. More specifically, although co-precipitation has a relatively small operation cost, it demands highly specialized operation supervision including the controlled addition of a trivalent iron chemical reagent as well as the thickening and the dewatering treatment of the produced sludge which contains the removed arsenic. For this reason, the use of consumable adsorbents is, in nowadays, the dominant trend, since it is by far the simplest arsenic removal method.

The main arsenic adsorption processes concerns the use of activated alumina ($Al_2O_3$) or titanium oxide ($TiO_2$) or iron oxy-hydroxides column beds. During the last years, the use of iron oxy-hydroxides in an adsorption bed is generally preferred due to:

the satisfactory adsorption capacity they present, the reduction of arsenic concentration below 1 μg/L, the process demands minimum care during the operation and the fulfilling of leaching requirements for safe disposal of the saturated oxy-hydroxides in the landfills as an inert waste.

However, iron oxy-hydroxides are able to efficiently remove only the ionic forms of As(V) [$H_2AsO_4^-$/$HAsO_4^{2-}$], while their yield concerning the uncharged form $H_3AsO_3$ of As(III) is very limited. The demand for As(III) removal makes iron oxy-hydroxides less competitive, since the treatment cost becomes significantly higher due to the low adsorption capacity for As(III) as well as to the need for addition of an extra oxidation stage for As(III).

Generally, there are two approaches to overcome As(III) removal problem by using adsorbents:
1. the use of two compounds where the first ($MnO_2$) oxidizes As(III) to As(V) and the second (iron oxy-hydroxide) sorbs the produced As(V),
2. the use of a mixed compound (iron/trivalent manganese oxy-hydroxide) that acts as an oxidizing reagent of the As(III) and as an adsorbing media at the same time for the formed As(V).

In the first approach, for the efficient removal of As(III) and As(V) as well, two-phase adsorbents, an iron oxy-hydroxide and a manganese dioxide ($MnO_2$), are used. The $MnO_2$ role is to oxidize As(III) to As(V), which is then adsorbed and bound to the iron oxy-hydroxide. The production procedure for such materials is the precipitation of manganese as $MnO_2$ by the reduction of $KMnO_4$ at an alkaline environment (pH>7) and its attachment to the iron oxy-hydroxide.

Accordingly, the EP 2 168 677 describes the synthetic procedure and the application for As(III) removal of a two-phase iron-manganese oxide. The development of this material takes place on-site on a carrier through the reaction of the iron sulfate ($FeSO_4$) or iron trichloride ($FeCl_3$) or manganese sulfate ($MnSO_4$) and potassium permanganate ($KMnO_4$). This patent refers to the synthesis of a mixture of two distinct materials: the iron hydroxide and $MnO_2$. This adsorbent succeeds to oxidize As(III) by $MnO_2$ and adsorbs the obtained As(V) by an iron hydroxide phase. Further information by the same researcher are reported in the publications G. Zhang et al., *Water Research* 41 (2007) 1921 and G. Zhang et al., *Journal of Hazardous Materials* 168 (2009) 820, where the procedure for a two-phase iron-manganese oxide synthesis is described by the reaction of $FeSO_4$ and $KMnO_4$ at a pH 7-8 in a batch reactor. The product's structure is characterized as a mixture of iron oxy-hydroxide and $MnO_2$ in an amorphous state. The oxidizing ability of $MnO_2$ allows the improvement of As(III) adsorption by the iron oxy-hydroxide, though the maximum adsorption capacity for As(V) appears to be much lower than that for As(III). Conclusively, the materials reported in the three above documents contain $MnO_2$, which has a very low adsorption capacity for As(V) and as a result the increase of its percentage in the two-phase oxide synthesis is causes the decrease of the total adsorption capacity and the higher treatment cost.

In similar, the publication H. Zeng et al., *Water Research*, 42 (2008) 4629 presents the study of an iron oxy-hydroxide adsorbent containing about 20% of manganese. The material consists of two separate phases: iron oxy-hydroxide (ferrihydrite) and bimesite-structured $MnO_2$. In addition, the manganese phase is situated in the interior of the material far from the surface and therefore the contact with the treated water as well as the expected oxidizing action is limited.

An As(III) removal procedure which uses as a first step a $MnO_2$ column bed for the oxidation of As(III) to As(V) followed by a Fe(III) precipitation step where As(V) is captured is described in the US 2010/0051555. However, the application of this method is rather complicated demanding the supervision of the two main arsenic removal methods: the adsorption process and the much complicated Fe(III) precipitation. The second method requires (1) controlled addition of the Fe (III) chemical reagent, (2) a filtration stage of the precipitate and (3) another complicated stage of iron sludge treatment (containing the removed arsenic) with thickening and mechanical dewatering.

In the second approach, arsenic removal is performed by a trivalent manganese substituted iron oxy-hydroxide. In general, related publications prepare such materials in batch operations, alkaline conditions (pH ~12), high temperatures and long reaction times (>1 day), in order to enable the Mn(II) oxidation to Mn(III) by bubling atmospheric oxygen and the incorporation of Mn(III) to the iron oxy-hydroxide structure.

Using this way, a series of manganese ferrihydrite where iron atoms were substituted by manganese in a percentage 0 to 100% are studied in the publication S. S. Mohanty et al., *Chemistry and Ecology*, 24 (2008) 23. For the synthesis two solutions of manganese and trivalent iron are co-precipitated in a pH-value around 12 and oxygen bubbling at 70° C. for a reaction period of 24 h. The batch mode, the high pH and temperature values and the long duration of the reaction are responsible for the increased energy and reagent consumption as well as the low productivity of the process. Very few information is provided for the reagents and since under the specific reaction conditions (oxygen bubbling, pH 12) the parallel precipitation of Fe(III) and oxidation-precipitation of Mn(II) is not expected (M. Stumm and J. Morgan, *Aquatic Chemistry: An introduction emphasizing chemical equilibria in natural waters* $2^{nd}$ Ed., 1981), it is not clear if an iron-manganese oxy-hydroxide will forms. Furthermore, there are no measurements supporting the existence of an iron-manganese hydroxide phase. But the most important disadvantage of these materials was the low adsorption capacity ($q_{10}$) at equilibrium concentration equal to that of maximum contaminant level of 10 µg/L, which is not more than 1 µg As(V)/mg at pH 7, while there is no data for the adsorption capacity of As(III) as it is the proper for the solids of this category.

In publication X Sun et al., *Clays and Clay Minerals*, 47 (1999) 474, a partially substituted by manganese atoms (0-10%) iron oxy-hydroxide (goethite) was prepared. Manganese goethite took place in a batch operation by the co-precipitation of trivalent iron nitrate [$Fe(NO_3)_3$] and bivalent manganese nitrate [$Mn(NO_3)_2$] in a strongly alkaline environment of 0.3 M NaOH and the prolonged aging for 15 days at the high temperature of 60° C., in order to oxidize Mn(II) to Mn(III) by oxygen. This publication studies, by means of X-ray spectroscopy methods, the As(III) oxidation mechanism together with Mn(III) reduction. The results showed that the As(III) oxidation rate by Mn(III) is very slow and, as it was measured that at room temperature, only a 20% of As(III) was oxidized to As(V) after 5 days. In addition, As(III) oxidation is combined with the reduction of Mn(III) to dissolved Mn(II), worsening the quality of treated water.

A partially substituted by manganese iron oxy-hydroxide in a percentage 13% ($Mn_{0.13}Fe_{0.87}OOH$) was studied for its adsorption ability on trivalent and pentavalent arsenic in publication the P. Lakshmipathiraj et al., *Journal of Colloid and Interface Science*, 304 (2006) 317. For its synthesis $FeSO_4$ and $MnSO_4$ were used together with $Na_2CO_3$ and the surfactant SLS at pH 10-12 to ensure conditions for the parallel precipitation of iron and manganese. Under these conditions and by bubbling oxygen an intermediate green rust carbonate salt was produced and then the substitution of iron atoms by Mn(III) led to the formation of $Mn_{0.13}Fe_{0.87}OOH$. The reduction of Mn(III) according to the reaction:

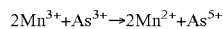

$$2Mn^{3+}+As^{3+} \rightarrow 2Mn^{2+}+As^{5+}$$

results in the leaching of Mn(II) to the treated water. The presented measurements show that the adsorption capacity of the material compared to the common iron oxyhydroxide adsorbents is an order of magnitude lower ($q_{max}$=5.72 µg/mg) for As(V) and 2-3 times lower ($q_{max}$=4.58 µg/mg) for As(III) in distilled water at pH 7.

The synthesis of iron oxy-hydroxide where iron atoms were partially substituted by Mn(III), as it is described in the previous publications, meets the following disadvantages:

The high production cost due to the application of a batch operation as well as due to the high temperature, the strong alkaline pH and the long reaction times in order to ensure Mn(II) oxidation to Mn(III) by a mild oxidant such as oxygen.

The production of oxy-hydroxides at high pH-values (high hydroxyl concentration) results in limited presence of positive charges in their surface, implying low adsorption capacity concerning As(V) oxy-ions.

The low oxidizing ability of Mn(III) together with the low oxidation rate of As(III) is responsible for the low As(III) adsorption, respectively.

Additionally, oxidation of As(III) by Mn(III) causes the leaching of Mn(II) in the treated water.

The present invention concerns a method for the synthesis of an adsorbing material consisting of a single-phase tetravalent manganese feroxyhite [$Fe_{(1-x)}Mn_xOOH$, with 0.05<x<0.25], in which a percentage of 0.05 to 25% of iron atoms has been substituted by Mn(IV) atoms, in a continuous flow reactor at weakly acidic conditions (pH 4-7) and high redox (300-800 mV) followed by a thickening stage.

The present invention solves the mentioned problem in the following ways:

The adsorbent consists of a single-phase which can efficiently adsorb both As(V) and As(III), since the same structure can oxidize As(III) and then adsorb it in oxy-hydroxide's uniform structure.

In this case, the oxidation of As(III) by Mn(IV) and therefore As(V) adsorption on the oxy-hydroxide is a very fast procedure. Furthermore, the produced Mn(III) remains in the feroxyhite structure as trivalent without being leached in the water.

Its production in acidic environment (high $H^+$ concentration) ensures a high positive charges density on its surface and as a result high adsorption capacities of arsenic oxy-ions.

The production in a continuous flow reactor at weak acidic conditions and environmental temperature allows high productivity, at low cost and good control of the synthesis parameters.

In addition, the easy and accurate control of pH and more importantly redox allows the production of materials with a variation of Fe substitution by Mn at a percentage ranging between 0.05 to 25%, that is equivalent to a variation of manganese content between 0.2 to 13% and iron content between 50 to 35% of dry material, respectively. Depending on the Mn-substitution percentage, the control of As(III) adsorption yield, keeping As(V) adsorption at high levels, is possible.

The present invention can be understood by the following analytical description of the synthesis method, the drawings and the application examples of the adsorption material's synthesis method.

The diagram correlating the adsorbent's capacity for As(III) and As(V) to the Mn percentage and the water pH (Drawing 4).

The aim of the present invention is the production of a tetravalent manganese feroxyhite adsorbent [$Fe_{(1-x)}Mn_xOOH$, with $0.05<x<0.25$] with a hollow spherical architecture providing high adsorption capacity for arsenic, especially for As(III), as well as other heavy metals from water. This aim was achieved by the method of reaction of Fe(II) and Mn(II) salts in a two-stage continuous flow reactor:

under weak acidic environment, where the pH is adjusted at a constant value in the range 4-7 by the addition of NaOH, $NaHCO_3$, $Na_2CO_3$, KOH, $KHCO_3$, $K_2CO_3$ solutions and a controllable high redox, adjusted at a constant value in the range 300-800 mV by the addition of strong oxidants $KMnO_4$, $NaClO_2$, $ClO_2$, $2KHSO_5 \cdot KHSO_4 \cdot K_2SO_4$, $Na_2S_2O_8$, $K_2S_2O_8$.

followed by the application of an ageing procedure in a mixing tank.

Figure 1:
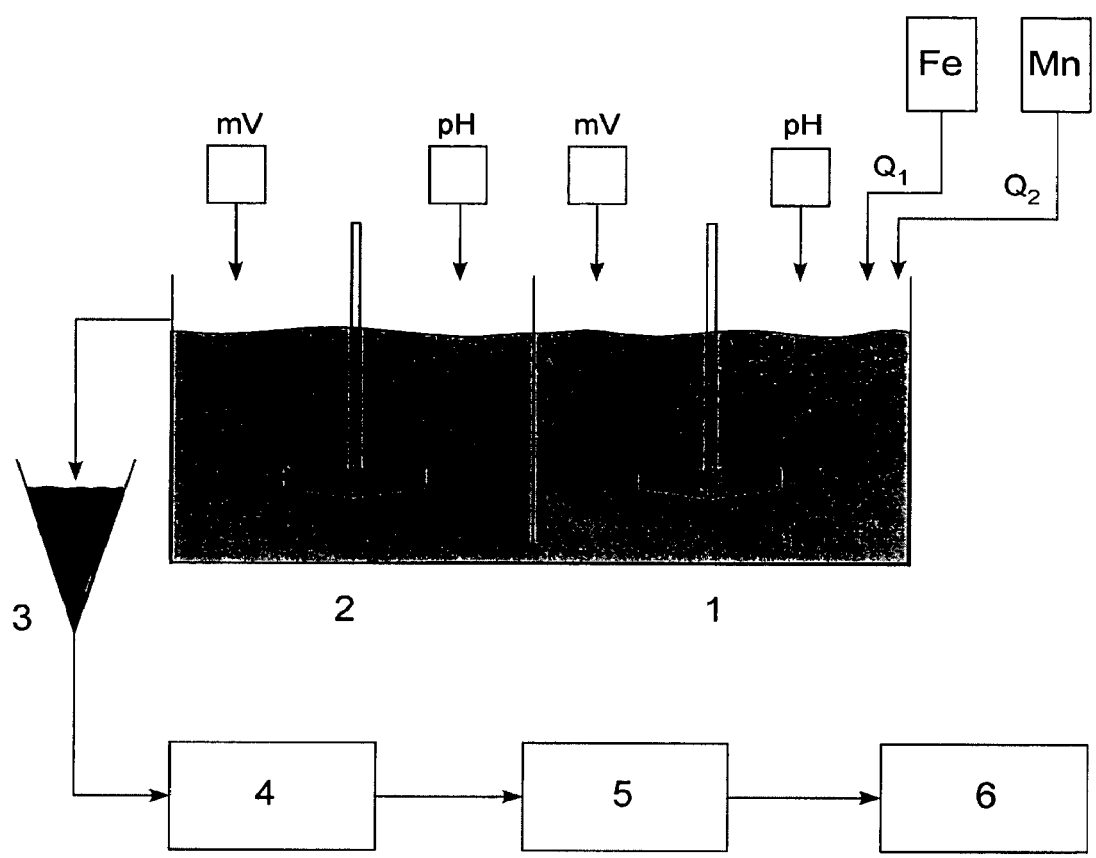
FIG. 1 shows a flow diagram of the synthesis procedure for the adsorbent according to the described method.

In details, the method of synthesis of the tetravalent manganese feroxyhite adsorbent [$Fe_{(1-x)}Mn_xOOH$, with $0.05<x<0.25$] proceeds as follows:

A continuous flow stirred reactor of two-stages (1) and (2) is used (FIG. 1). The retention time in each stage is at least 30 min. The quantity of the produced product depends on the flow of iron and manganese reagents $Q_1$ and $Q_2$, with the condition of a retention-reaction time of at least 30 min for each of the two reactors. In reactor (1), an aqueous solution of $FeSO_4$ or $FeCl_2$ with a concentration of 1-100 g/L and an aqueous solution of $KMnO_4$ or $MnSO_4$ or $MnCl_2$ or $Mn(NO_3)_2$ with a concentration of 1-100 g/L are simultaneously added. The control of the Fe(II) and Mn(VII) or Mn(II) flow ratio as well as of the manganese solution concentration allows the production of materials with a Mn(IV) percentage varying between 0.2 to 13% wt and having a structure type $Fe_{(1-x)}Mn_xOOH$, with $0.05>x>25$.

In both reactor (1) and reactor (2), during the reaction pH-value is adjusted at a constant value between 4-7, with an optimum pH range from 5.5 to 6, by the addition of a solution of one or more of the alkaline reagents NaOH, $NaHCO_3$, $Na_2CO_3$, KOH, $KHCO_3$, $K_2CO_3$. At the same time, redox, is adjusted at a constant value between 300-800 mV by the addition of a solution of one or more of the strong oxidant reagents $KMnO_4$, $ClO_2$, $NaClO_2$, ($2KHSO_5 \cdot KHSO_4 \cdot K_2SO_4$), $Na_2S_2O_8$, $K_2S_2O_8$), with an optimum redox range 600 to 650 mV in the optimum pH range.

Figure 2:
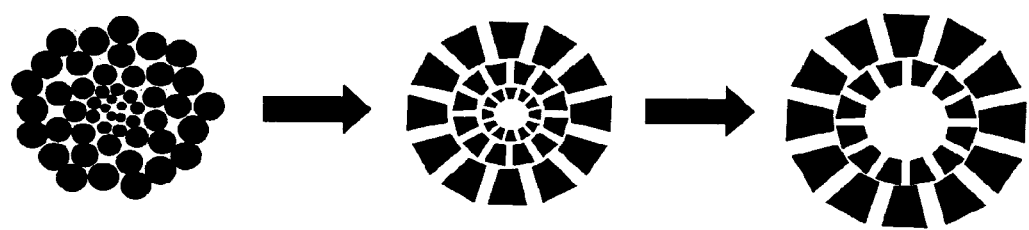
FIG. 2 shows a scheme of the mechanism for the growth of the hollow architecture material's grain.

The produced mixture comes out from the reactor (2) outflow and is kept in a thickening tank (3) under slow stirring for 1-48 hours, in order to achieve the tuning of grains geometry from irregular-shaped to hollow spherical. The mechanism which explains the hollow spherical geometry formation of the grains is the initial production of microporous material's spheres consisting of different-sized particles' aggregates, the consumption of the smaller particles situated close to the core by the larger ones in the grain shell and finally the formation of a porous spherical grain with a hollow (FIG. 2). This procedure is described as the Ostwald ageing mechanism and its yield and as a consequence the hollow diameter depends on the retention time in the thickening tank.

The precipitate after the thickening is mechanically dewatered (4), formed in size 250-2500 μm (5) and dried (6) (FIG. 1).

The adsorbent material can be used for the adsorption of all arsenic forms from water, as well as of other heavy metals like vanadium, antimony, mercury, nickel and lead preferably in a column bed. Its use concerns potable water treatment units for domestic, industrial and municipal supply as well as industrial and municipal waste water treatment.

Figure 3:
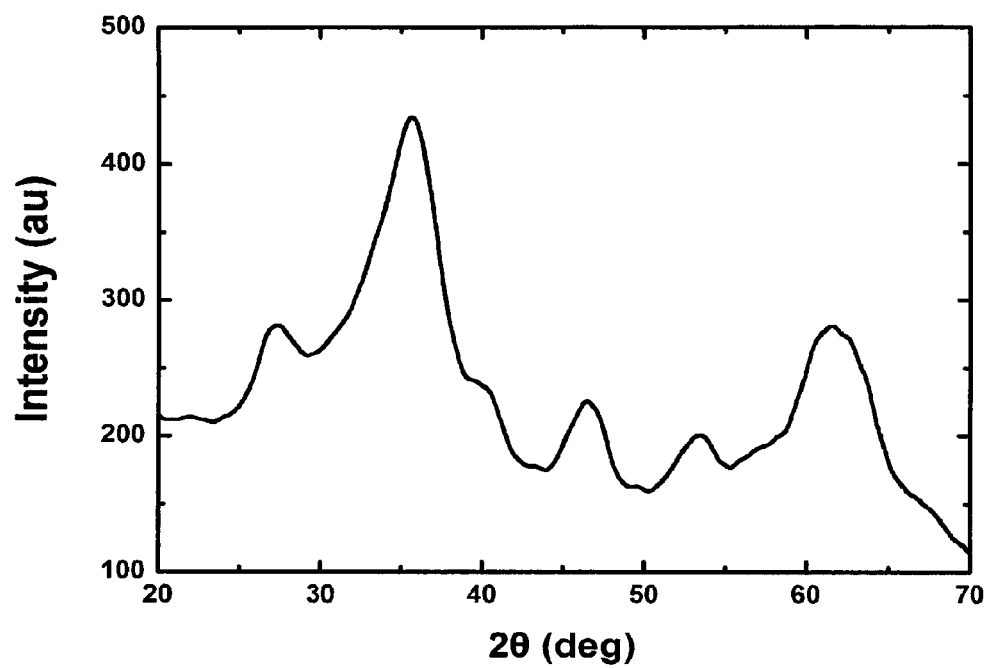
FIG. 3 shows a XRD diagram which verifies the tetravalent manganese feroxyhyte structure of the product.

According to the procedure described above, the tetravalent manganese feroxyhite can be formed at the pH range 4-9. However, over pH 7 the adsorption capacity of As(III) and As(V) is dramatically reduced. In X-ray diffraction (XRD) diagram for the material with a substitution percentage 25% ($Fe_{0.75}Mn_{0.25}OOH$), shown in FIG. 3, a feroxyhite-structured iron oxy-hydroxide, with its iron atoms partially substituted by tetravalent manganese, was identified.

The adjustment of redox over 600 mV does not seriously affect adsorption capacity of the material but increases the production cost due to the consumption of the oxidant. In the contrary, its adjustment at values lower than 300 mV results in low manganese valence [Mn(III)] in the feroxyhite meaning lower As(III) adsorption capacity.

More specifically, the tetravalent manganese feroxyhite solid has a specific surface 100-300 $m^2/g$ and a grain size 250-2500 μm. Its maximum adsorption capacity ($q_{max}$) for water with pH 6-8 and an environment of 10 mM NaCl, is 47-87 μg As(III)/mg and 62-117 μg As(V)/mg.

Figure 4:
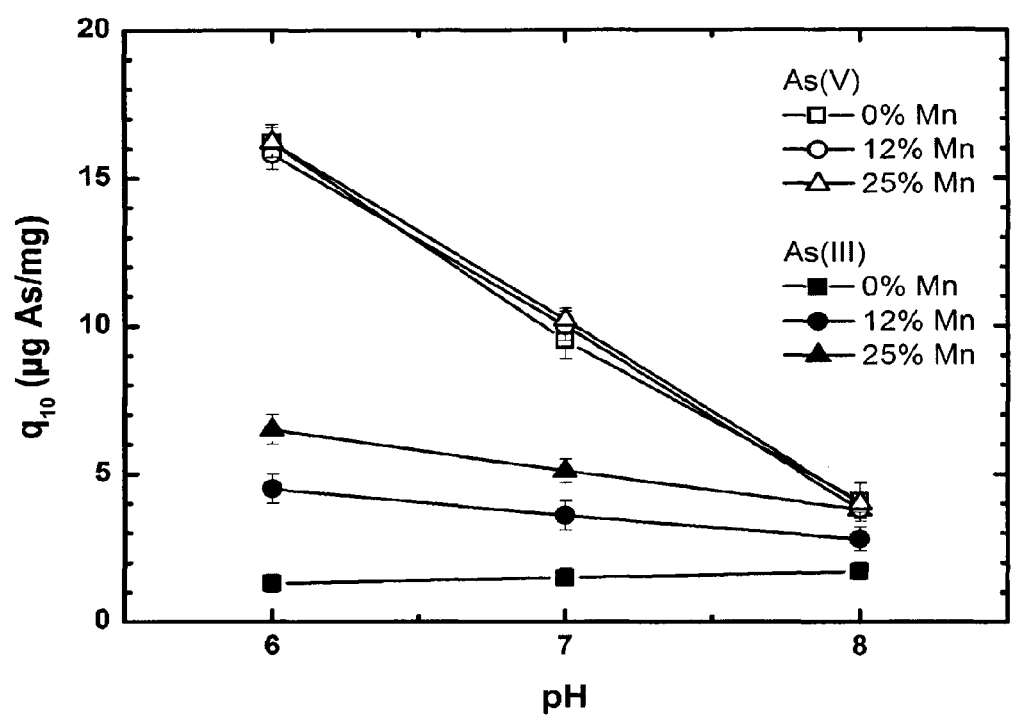
FIG. 4 shows a diagram correlating the adsorbent's capacity for As(III) and As(V) to the Mn percentage and the water pH.

The ability of the material to adsorb As(III) and As(V) from natural water with pH 6-8 and at the same time to decrease residual concentration at the limit of 10 μg/L ($q_{10}$ parameter) is shown in the diagram of FIG. 4. The measurements refer to adsorbents with a substitution percentage 0%, 12% and 25%. In these experiments the tested water was prepared according to NSF standard whose composition reaches the specifications of the majority of natural waters, containing most of the interfering parameters for arsenic adsorption. NSF standard water composition is 88.8 mg/L $Na^+$, 40 mg/L $Ca^{2+}$, 12.7 mg/L $Mg^{2+}$, 183 mg/L $HCO_3^-$, 50 mg/L $SO_4^{2-}$, 71 mg/L $Cl^-$, 2 mg/L $NO_3^-$—N, 1 mg/L F, 0.04 mg/L $PO_4^{3-}$—P and 20 mg/L $SiO_2$. The $q_{10}$ maximum values appear at water pH 6 for As(V) adsorption at 18 μg/mg for $Fe_{0.88}Mn_{0.12}OOH$ and for As(III) adsorption at 7.5 μg/mg for $Fe_{0.75}Mn_{0.25}OOH$. The variation of Mn(IV) content in feroxyhite does not seem to seriously affect As(V) adsorption efficiency but in the contrary, as Mn(IV) concentration decreases, As(III) adsorption capacity falls with the minimum value obtained for zero concentration of Mn(IV). This fact allows the production of a feroxyhite with a composition matching to the specific quality of the treated water with respect to the concentration ratio [As(V)]/[As(III)].

EXAMPLE OF METHOD APPLICATION 1

A solution 45 g/L $FeSO_4H_2O$ is supplied with a flow $Q_1=1$ $m^3/h$ and mixed with a solution 15 g/L $KMnO_4$ with a flow around $Q_2=1$ $m^3/h$ in the stirred reactor (1) with volume 2 $m^3$. The flow of $KMnO_4$ is adjusted to keep the redox in the range 625±25 mV. The reaction pH is adjusted to 5.5±0.1 by the addition of NaOH solution with concentration 30% w/w. A similar redox and pH adjustment takes place in the second reactor (2) by adding small quantities of $KMnO_4$ and NaOH. The product in the outflow of the reactor (2) goes to the thickening tank where it remains under slow stirring for 24 h, then it is mechanically dewatered e.g. by centrifuge or filter-press, formed to a size 250-2500 μm and dried at 110° C. The obtained product has a structure type $Fe_{0.75}Mn_{0.25}OOH$ and the manganese valence is 4.0. The adsorption capacity for As(V) is 11 μg/mg and for As(III) 5 μg/mg in standard NSF water with pH 7.0.

EXAMPLE OF METHOD APPLICATION 2

A solution 45 g/L $FeSO_4H_2O$ is supplied with a flow $Q_1=2$ $m^3/h$ and mixed with a solutio 23 g/L $KMnO_4$ with a flow $Q_2=0.5$ $m^3/h$ in the stirred reactor (2) with volume 2 $m^3$. The redox is adjusted in the range 625±25 mV by the addition of a solution $2KHSO_5 \cdot KHSO_4 \cdot K_2SO_4$ with concentration 100 g/L. The reaction pH is adjusted to 5.5±0.1 by the addition of NaOH solution with concentration 30% w/w. A similar redox and pH adjustment takes place in reactor (2) by adding small quantities of $2KHSO_5 \cdot KHSO_4 \cdot K_2SO_4$ and NaOH. The product in the outflow of the reactor (2) goes to the thickening tank where it remains under slow stirring for 24 h, then it is mechanically dewatered e.g. by centrifuge or filterpress, formed to a size 250-2500 μm and dried at 110° C. The obtained product has a structure type $Fe_{0.88}Mn_{0.12}OOH$ and the manganese valence 4.0. The adsorption capacity for As(V) is 11 μg/mg and for As(III) 3.5 μg/mg in standard NSF water with pH 7.0.

EXAMPLE OF METHOD APPLICATION 3

A solution 40 g/L $FeSO_4H_2O$ and 5.5 g/L $MnSO_4H_2O$ is supplied with a flow $Q_1=20$ m³/h in the stirred reactor (1) with volume 20 m³. The redox is adjusted in the range 625±25 mV by the addition of a solution $NaClO_2$ 25% w/w. The reaction pH is adjusted to 5.5±0.1 by the addition of NaOH solution with concentration 30% w/w. A similar redox and pH adjustment takes place in reactor (2) by adding small quantities of $NaClO_2$ Kai NaOH. The product in the outflow of reactor (2) goes to the thickening tank where it remains under slow stirring for 24 h, then it is mechanically dewatered e.g. by centrifuge or filterpress, formed to a size 250-2500 μm and dried at 110° C. The obtained product has a structure type $Fe_{0.88}Mn_{0.12}OOH$ and the manganese valence 4.0. The adsorption capacity for As(V) is 11 μg/mg and for As(III) 3.5 μg/mg in standard NSF water with pH 7.0.

The method described in this invention can be applied in laboratory or industrial scale depending on the productivity of the continuous flow reactor.

The product prepared by the described method of synthesis of this invention can be used for arsenic adsorption and especially for As(III) forms as well as for other heavy metals including vanadium, antimony, mercury, nickel and lead preferably in a column bed or powder dispersions.

The invention claimed is:

1. A method for the synthesis of a tetravalent manganese feroxyhite ($\delta\text{-}Fe_{(1-x)}Mn_xOOH$), characterized by the fact that the method takes place in a continuous flow reactor, under weak acidic conditions and controlled redox and the method comprises the following steps:
   i) in a first stage reactor, $FeSO_4$ or $FeCl_2$ is added as an iron source, $KMnO_4$ $MnSO_4$ or $MnCl_2$ or $Mn(NO_3)_2$ is added as a manganese source with a solution concentration of 1-100 g/L in the inflow, with the pH during the reaction adjusted in the weak acidic range 4-7 by adding one or more of the reagents NaOH, $NaHCO_3$, $Na_2CO_3$, KOH, $KHCO_3$ and $K_2CO_3$, and the redox potential adjusted in the range 300-800 mV by adding one or a combination of more than one of the reagents $KMnO_4$, $NaClO_2$, $ClO_2$, $2KHSO_5 \cdot KHSO_4 \cdot K_2SO_4$, $Na_2S_2O_8$ and $K_2S_2O_8$,
   ii) subsequently, the reaction is completed in a second stage reactor with the pH value in the second stage reactor being adjusted in the weak acidic range 4-7 by adding one or a combination of more than one of the reagents NaOH, $NaHCO_3$, $Na_2CO_3$, KOH, $KHCO_3$ and $K_2CO_3$ and the redox potential adjusted in the range 300-800 mV by adding one or more of the reagents $KMnO_4$, $NaClO_2$, $ClO_2$, $2KHSO_5 \cdot KHSO_4 \cdot K_2SO_4$, $Na_2S_2O_8$ and $K_2S_2O_8$, while the retention time is at least 30 min in each one of the first stage reactor and second stage reactor,
   iii) subsequently, the product comes out from the outflow of the second stage reactor, enters the thickening tank, where by a slow stirring for 1-48 h the grain geometry is controlled between irregular spheres to hollow spheres and the specific surface area between 100 m²/g to 300 m²/g.

2. A method for the synthesis of a tetravalent manganese feroxyhite ($\delta\text{-}Fe_{(1-x)}Mn_xOOH$) according to claim 1, characterized by the fact that the optimum method's application is observed when reaction pH is adjusted at 5.5±0.5 and the redox potential is adjusted at 600±50 mV.

3. A method for the synthesis of a tetravalent manganese feroxyhite ($\delta\text{-}Fe_{(1-x)}Mn_xOOH$) according to claim 1, characterized by the fact that it is sequenced by mechanically dewatering, forming in grains with a size preferably 250-2500 μm and drying at 100-200° C.

4. The adsorbent material produced according to the method of the claim 1, consists by a single-phase tetravalent manganese feroxyhite ($\delta\text{-}Fe_{(1-x)}Mn_xOOH$), where a percentage of 0.05-25% of iron has been isomorphically substituted by manganese atoms, with an irregular spherical to hollow spherical geometry and a specific surface area between 100 m²/g to 300 m²/g and a grain size preferably 250-2500 μm.

5. The use of the adsorbent material of claim 4 produced according to the method of the claim 1, for the removal of trivalent or/and pentavalent arsenic as well as vanadium, antimony, mercury, nickel, lead from water by contacting the material with water in a column bed or powder dispersions.

* * * * *